United States Patent [19]

Kuck

[11] 3,799,704

[45] Mar. 26, 1974

[54] WASHER PUMP ASSEMBLY

[75] Inventor: Lloyd L. Kuck, Dayton, Ohio

[73] Assignee: General Motors Corporation, Detroit, Mich.

[22] Filed: Nov. 24, 1972

[21] Appl. No.: 309,247

[52] U.S. Cl............... 417/319, 15/250.02, 417/471
[51] Int. Cl.............................................. B60s 1/48
[58] Field of Search .......... 15/250.02; 417/319, 471

[56] References Cited
UNITED STATES PATENTS

| | | | |
|---|---|---|---|
| 2,965,913 | 12/1960 | Ziegler............................ | 15/250.02 |
| 3,078,493 | 2/1963 | Ryck et al........................ | 15/250.02 |
| 3,503,090 | 3/1970 | Romanowski.................... | 15/250.02 |
| 3,574,882 | 4/1971 | Petry et al. ..................... | 15/250.02 |

*Primary Examiner*—Edward L. Roberts
*Attorney, Agent, or Firm*—W. A. Schuetz

[57] ABSTRACT

In a preferred form, this disclosure relates to a programmed washer pump assembly for a windshield cleaning apparatus and with the washer pump assembly being operable to intermittently deliver a predetermined number of squirts of washer fluid onto the windshield each time it is energized. The washer pump assembly includes a reciprocable pump having a spring actuated delivery stroke and an interruptible driving connection with a drive means. The washer pump assembly further includes a control and timer mechanism which is operable, when momentarily energized, to establish a driving connection between the pump and the drive means for a predetermined time interval and then automatically and abruptly interrupt the driving connection therebetween.

4 Claims, 11 Drawing Figures

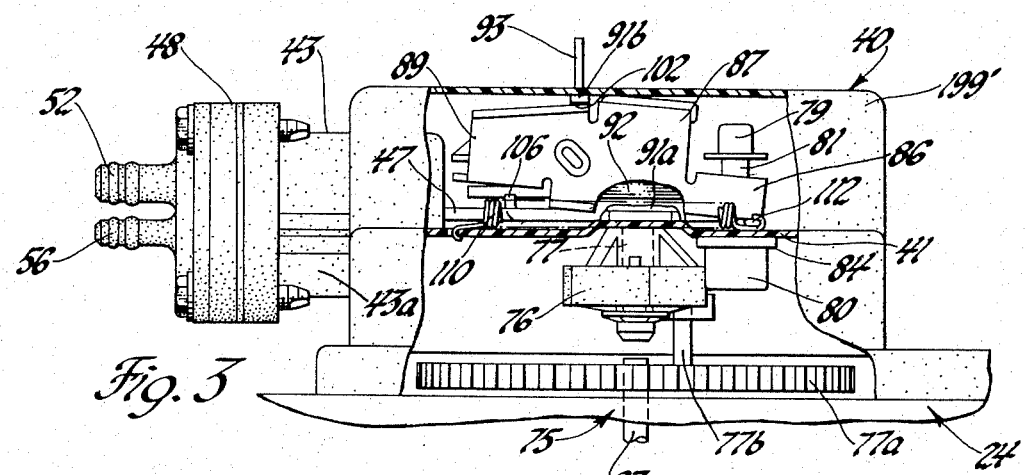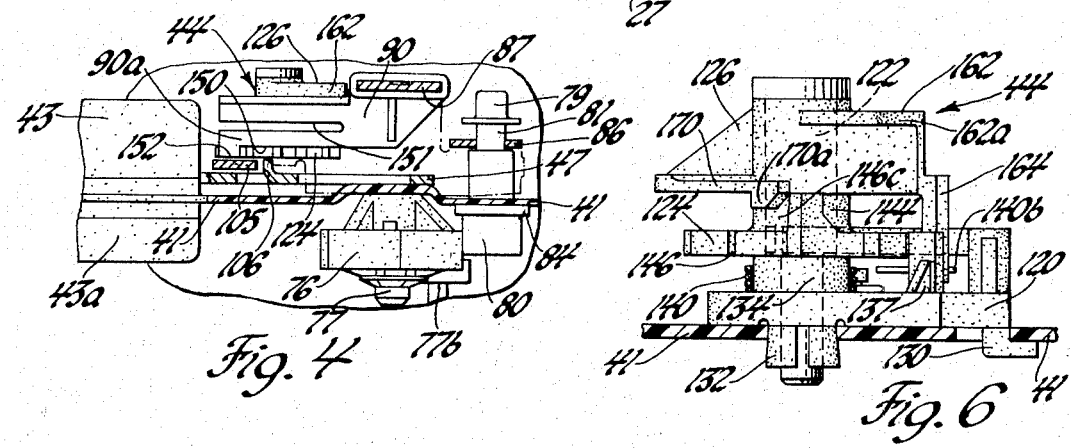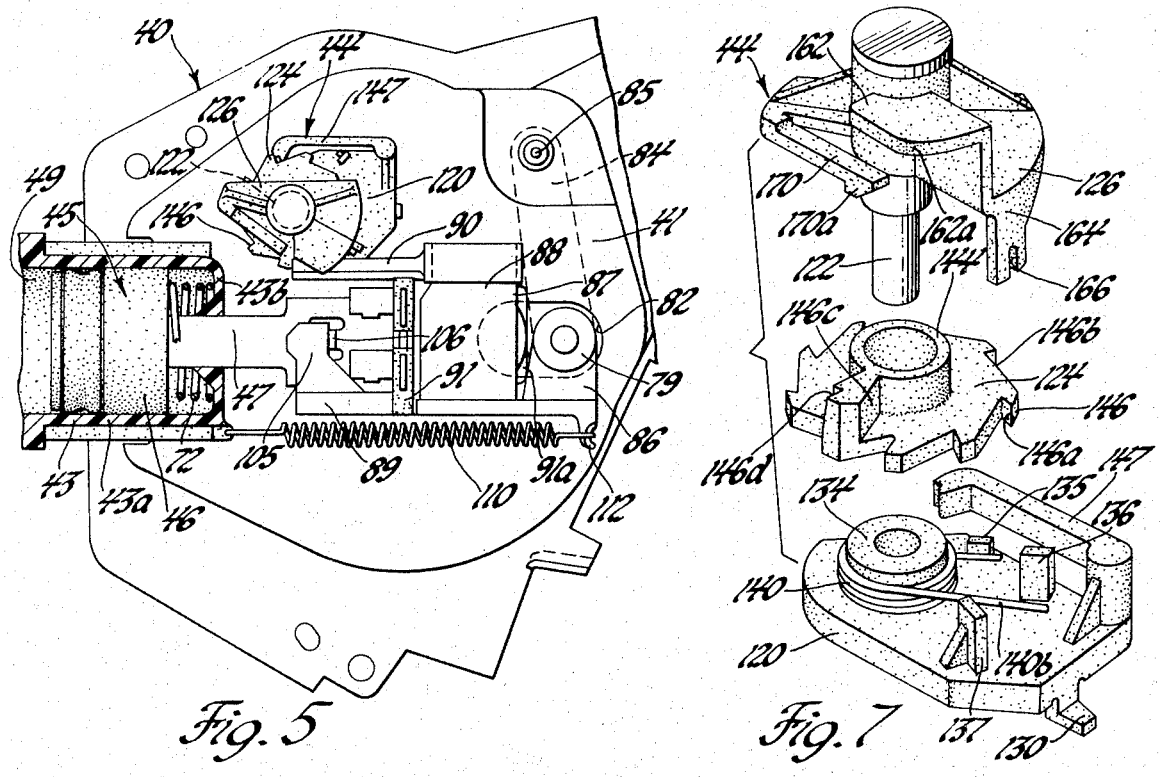

WASHER PUMP ASSEMBLY

The present invention relates to a windshield or window cleaning apparatus and more particularly to a programmed washer pump assembly for delivering washer fluid for a predetermined time interval to a windshield of a vehicle.

Known programmed washer pump assemblies for intermittently squirting washer fluid onto a windshield of a vehicle for a predetermined time interval or number of wiper strokes have included a reciprocable plunger or piston type pump having a spring actuated delivery stroke and an interruptible driving connection with the drive means or motor for the wiper unit. The interruptible driving connection was effected by providing a lost motion drive connection between the pump plunger and wiper unit drive means and by providing a control and timer mechanism which included a wiper stroke counting means in the form of an indexable ratchet wheel having a cam thereon which engaged a lug or tab on the pump plunger to hold the latter against movement through its delivery stroke when the ratchet wheel was indexed to a stop position. The driving connection for the pump was established by rotatably indexing the ratchet wheel and cam from the stop position to allow the pump plunger to be spring actuated through its delivery stroke. Thereafter, the ratchet wheel was sucessively indexed for a predetermined number of wiper strokes until it had completed one revolution and was again in the stop position in which the cam held the plunger against movement through its delivery stroke. Such a washer unit is shown in U.S. Pat. No. 3,078,493 and assigned to the same assignee as the present invention. These known programmed washer units have also included a ratchet wheel and cam which had a steep rise portion which interferred with the movement of the plunger on the indexing movement next preceeding stoppage of the plunger and the ratchet wheel was provided with a flexible tooth which yielded to permit relative movement between the ratchet wheel and the pump plunger to allow the latter to clear the rise portion during this indexing movement. This provision enabled the pump plunger to be abruptly shut off with the resulting advantages that each of the squirts of the washer pump were at a constant pressure and that no or only minimal wastage of washer fluid resulted. Such washer units are shown in U. S. Pat. Nos. 3,503,090 and 3,574,882, and assigned to the same assignee as the present invention.

Although the above-known programmed washer pump assemblies have been highly satisfactory in operation, efforts are nevertheless being made to improve their efficiency and durability as well as to reduce their cost of manufacture. Accordingly, the present invention provides a new and improved washer pump assembly of the general type referred to above and which is of a relatively simple and economical construction and which requires less parts.

An object of the present invention is to provide a new and improved washer pump assembly of the type referred to above and which includes a control and timer mechanism operable to establish a driving connection between the pump and the drive means for a predetermined time period and then automatically interrupt the driving connection therebetween, and wherein the timer means is rotatably supported by the support means adjacent a constantly reciprocated pawl which is spring biased towards a first position when washer operation is not desired, but which is movable to a second position to reciprocate the pump plunger and index the timer means when washer operation is desired, the timer means including an indexable ratchet wheel which is adapted to be indexed a predetermined angular extent during one stroke of the reciprocably movable pawl when the latter is in its second position and a retainer means operable to hold the pawl in its second position after it has been moved thereto until the ratchet wheel has been indexed a predetermined angular extent and then effect release of the pawl to allow it to move toward its first position in which it does not reciprocate the pump plunger and index the ratchet wheel as it is reciprocated by the drive means.

Yet another object of the present invention is to provide a new and improved washer pump assembly, as defined in the next preceding object, and wherein the retainer means is rotatably supported on the same shaft as the ratchet wheel and is spring biased toward a first position in which it overlies the reciprocable pawl to hold the latter in its second position, but normally held in a second position by the pawl when the latter is in its first position, and wherein the ratchet wheel includes a high tooth which engages a finger on the retainer means to rotate the same from its first position towards its second position on the last indexing movement of the ratchet wheel to allow the pawl to be released and interrupt the driving connection between the washer pump and the drive means.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 3 is a fragmentary sectional view, with parts shown in elevation, and taken approximately along line 3—3 of FIG. 2;

FIG. 4 is a fragmentary sectional view, with parts shown in elevation, and looking in the direction of the arrows 4—4 of FIG. 3;

FIG. 5 is a fragmentary view similar to that shown in FIG. 2, but showing different parts thereof in different positions;

FIG. 6 is an enlarged fragmentary sectional view taken approximately along line 6—6 of FIG. 2;

FIG. 7 is an exploded view of part of the windshield washer pump assembly of the present invention;

Figure 8:
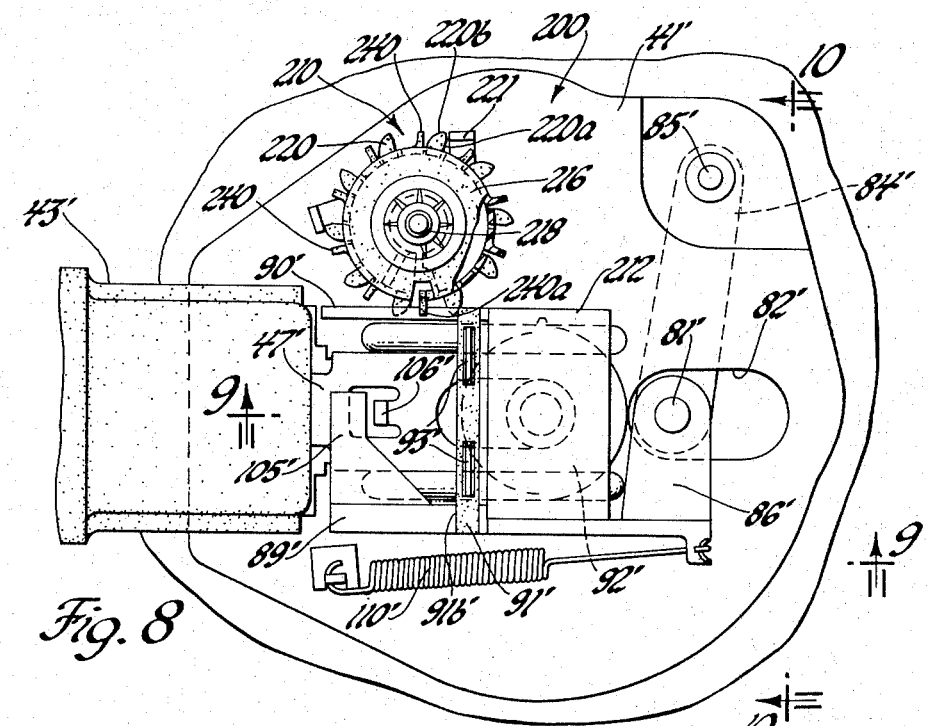
FIG. 8 is a fragmentary plan view of a second embodiment of the novel windshield washer pump assembly of the present invention.
Figure 9:
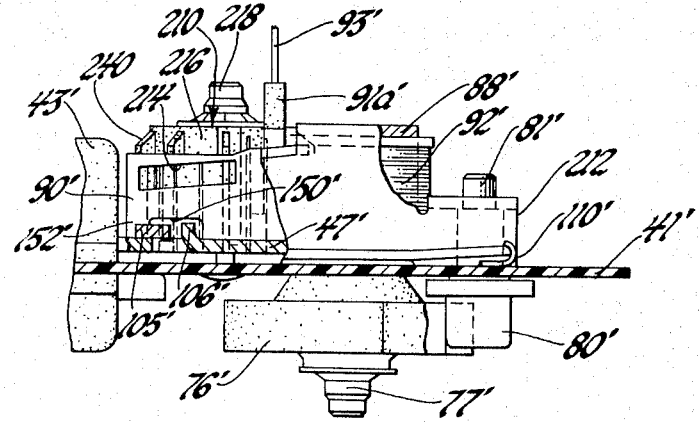
Figure 10:
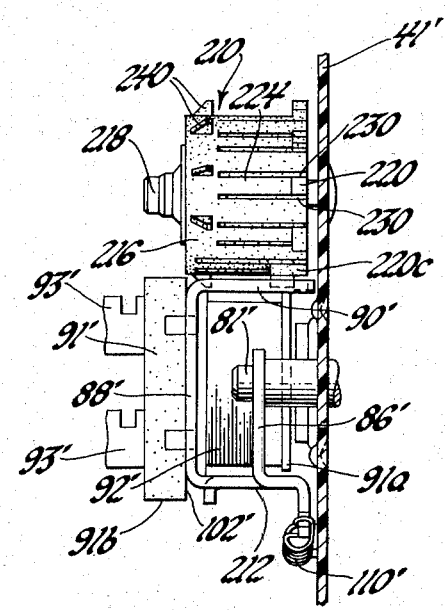
Figure 11:
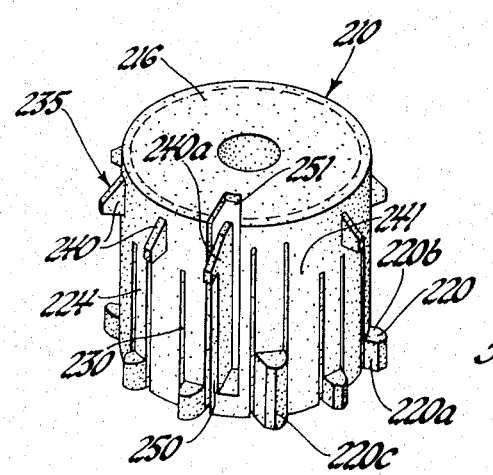

FIGS. 9 and 10 are fragmentary sectional views, with portions shown in elevation, and taken approximately along lines 9—9 and 10—10 of FIG. 8; and FIG. 11 is a perspective view of part of the windshield washer pump assembly shown in FIG. 8.

Figure 1:
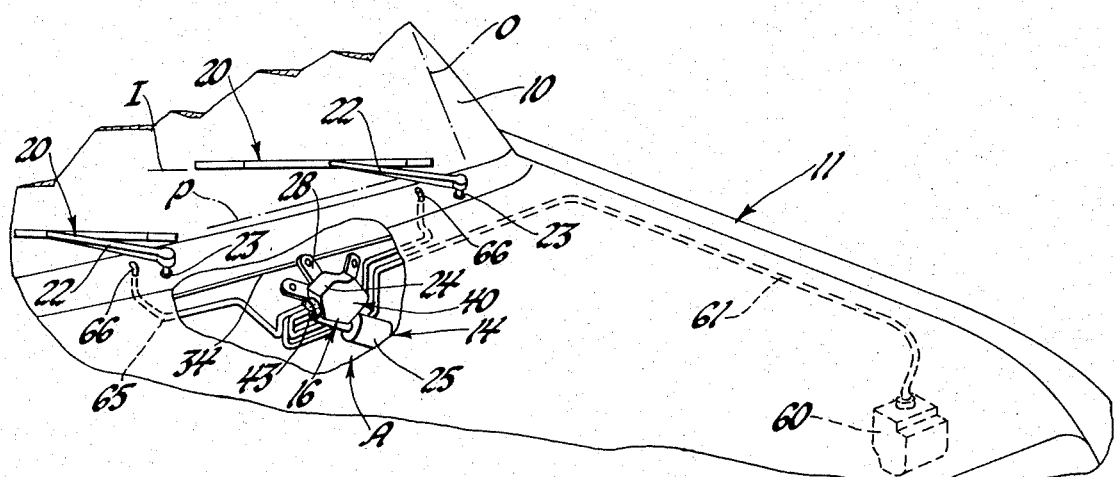
FIG. 1 is a fragmentary perspective view of an automotive vehicle embodying the novel windshield washer pump assembly of the present invention.

As representing a preferred embodiment of the present invention, FIG. 1 of the drawings shows a windshield cleaning apparatus A for cleaning a windshield 10 of an automtmotive vehicle 11. The windhsield cleaning apparatus A broadly comprises a wiper unit 14 for wiping the windshield 10 and a programmed washer unit 16 for delivering intermittent squirts of cleaning fluid onto the windshield 10 and which is adapted to be operated conjointly in timed relationship with the wiper unit for a predetermined number of wiper strokes.

The wiper unit 14 comprises a pair of wiper blades 20 which are adapted to be moved to and fro in arcuate paths across the windshield 10 between inboard and outboard positions I and O, respectively and to a depressed parked position P when wiper operation is being terminated. The wipers 20 are carried by oscillatable wiper arms 22 drivingly connected to oscillatable drive pivots 23 suitably carried by the vehicle at spaced locations adjacent the lower edge of the windshield 10.

The drive pivots 23 are adapted to be oscillated by a drive mechanism which includes an electric wiper motor 25 connected via a conventional gear reduction unit 24 to a unidirectional output shaft 27 having a crank arm 28 affixed thereto. The drive mechanism could be of any suitable or conventional construction, but is preferably of the type shown in U.S. Pat. No. 3,503,090. The crank arm 28 is drivingly connected with the oscillatable drive pivots 23 via a suitable or conventional linkage arrangement 34 and, when rotated, functions through the linkage arrangement 34 to simultaneously oscillate the drive pivots 23 which in turn cause the wiper arms 22 and blades 20 to be oscillated in tandem to and fro across the windshield.

Figure 2:
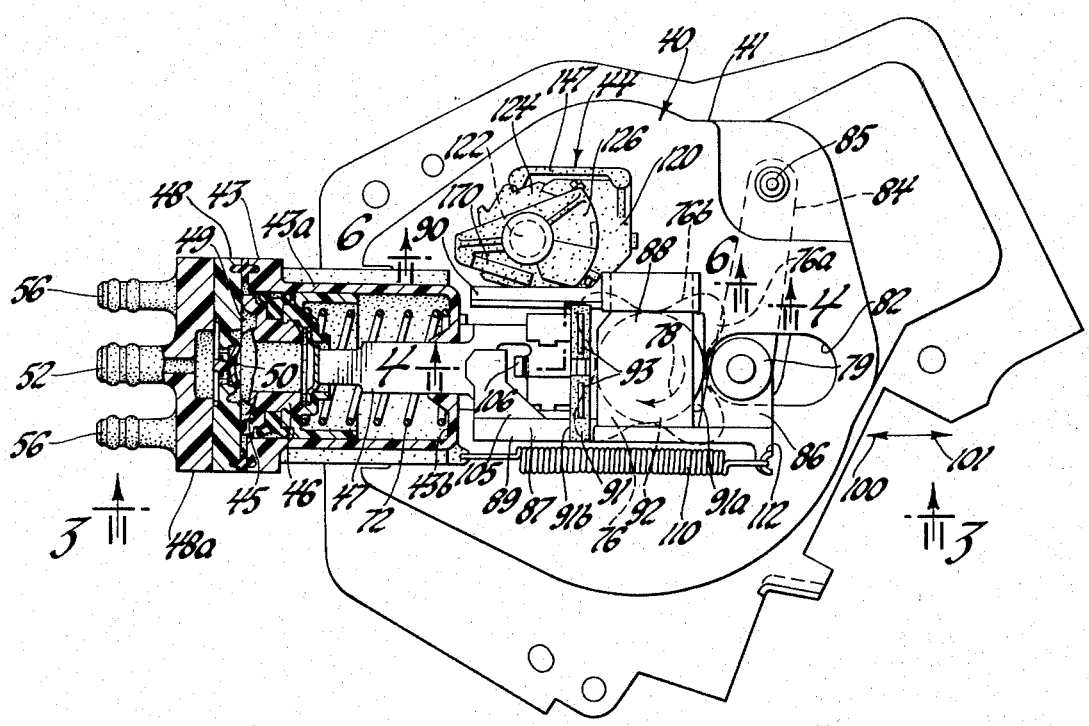
FIG. 2 is an enlarged plan view with parts shown in section of the windshield washer pump assembly of the present invention.

The washer unit 16, when actuated, is adapted to be operated conjointly with the wiper unit 14 and comprises a washer pump assembly 40 for intermittently providing squirts of washer fluid to be applied to the windshield 10. As best shown in FIG. 2, the washer pump assembly 40 comprises, in general, a support means or frame 41 which is suitably secured to the housing of the gear reduction unit 24, a washer pump 43 carried by the frame 41 and which has an interruptible driving connection with the wiper motor 25, and a control or timer mechanism 44 which is operable to establish a driving connection between the pump 43 and the wiper motor 25 for a predetermined number of wiper strokes and then automatically interrupt the driving connection therebetween.

The washer pump 43 comprises a plastic pump housing 43a secured to the support frame 41 and a reciprocably movable plunger or pumping member 45 slidably received within the housing 43a. The plunger 45 includes a piston assembly 46 and a flat pump rod 47 having one end connected to the piston assembly 46 and the other end projecting rearwardly, i.e., toward the right, as viewed in FIGS. 2 and 3, beyond the adjacent rearward end 43b of the housing 43a. The pump 43 also includes a valve chamber part 48 secured to the housing 43a at the forward end remote from the rod 47 and which defines with the piston 46 a chamber 49. The valve chamber part 48 contains an inlet check valve 50 for controlling communication between an inlet nipple 52 of a nipple body 48a and the chamber 49 and a pair of outlet check valves (not shown) for controlling communication between the chamber 49 and a pair of outlet nipples 56 of the nozzle 48a.

The plunger 45 is adapted to be reciprocably moved through intake and discharge strokes. When the plunger 45 is moved through its intake stroke, toward the right as viewed in FIGS. 2 and 3 of the drawings, washing fluid is drawn from a reservoir 60 via conduit 61, inlet nipple 52 and past the check valve 50 into the chamber 49. When the plunger is moved through its discharge stroke, toward the left as viewed in FIGS. 2 and 3, the fluid in the chamber 49 is forced under pressure past the outlet check valves (not shown) and delivered via outlet nipples 56 and conduits 65 to a pair of nozzles 66 mounted on the vehicle adjacent the lower edge of the windshield 10. The fluid delivered to the nozzles 66 is emitted in jet form and directed toward designated areas on the windshield 10 located in the path of movement traversed by the wiper blades 20.

The plunger 45 is moved through its discharge stroke by a compression spring 72 encircling the pump rod 47 and having one end in abutting engagement with the end wall 43b of the housing 43 and the other end in abutting engagement with the piston assembly 46 at its side opposite the chamber 49. The compression spring 72 biases the plunger 45 toward engagement with the valve chamber part 48.

The plunger 45 is adapted to be moved through its intake stroke in opposition to the biasing force of the compression spring 72 by a drive means 75 when the washer unit 16 is placed in operation. The drive means 75 comprises a multi-lobed cam 76 (see FIG. 3) rotatably supported on a shaft 77 secured to the support frame 41. As best shown in FIG. 2, each lobe of the cam has a rise portion 76a and a fall portion 76b. The cam 76 drivingly connected with a gear 77a of the gear reduction unit 24 by a drive pin 77b secured to the gear 77a and received within a slot (not shown) in the cam 76. The cam 76 is rotated in the direction indicated by the arrow 78 in FIG. 2 when rotated by the gear reduction unit 24 in response to the energization of the wiper unit motor 25.

The drive means 75 further includes a cam follower means 79 for moving the plunger through its intake stroke. The cam follower means 79 is biased into engagement with the periphery of the cam 76 and includes a cam follower member or roller 80 which rides in peripheral engagement with the cam 76 and which is fixed to the lower end of a drive member or pin 81 as viewed in FIG. 3. The drive pin 81 projects upwardly through an elongated slot 82 in the frame 41 and is connected intermediate its ends to one end of a support lever 84. The other end of the support lever 84 is pivotally connected to the support frame via pivot pin means 85. The drive pin 81 at its upper end is swivelly connected to an ear 86 of a pawl 87.

The pawl 87 is of a generally rectangular, inverted channel shape and has an upper bridge portion 88 and a pair of spaced side portions or legs 89 and 90. The legs 89 and 90 extend forwardly of the bridge portion and the ear 86 is integral with and extends transversely of the leg 89 at a location rearward of the bridge portion 88. The pawl 87 straddles a plastic frame 91 for supporting a solenoid coil 92. The frame 91 includes a base portion 91a which is secured to the frame 41 and which supports the solenoid coil 92 and an upwardly extending portion 91b disposed between the legs 89 and 90 and which supports electric terminals 93 for the solenoid coil 92. The bridge portion 88 overlies the solenoid coil 92.

The pawl 87 is adapted to be reciprocated in the direction of the arrows 100 and 101 by the drive pin 81. The pawl 87 is also movable toward and from the frame 41 between first and second positions. When in its first position, as shown in FIG. 3, the pawl 87 is disposed at an acute angle with respect to the frame 41 and its leg 89 engages the underside of shoulder 102 on the upwardly extending portion 91b of the plastic frame 91 for the solenoid coil 92. The leg 89 also engages the side of the portion 91b of the frame 91. When in this position, an extending 105 extnding transversely of the leg 89 toward the leg 90 is disposed above an upturned tab 106 on the pump rod 47. Thus, when the pawl is in its first position, as shown in FIG. 3, and is reciprocated by the drive pin 81, the ear 105 will not engage the rod 57 and hence will not effect reciprocable movement of the plunger 45.

When the pawl 87 is in its second position, as shown in FIG. 4, it is disposed generally parallel to the plane of the frame 41 and its ear 105 will engage the tab 106 on the pump rod 47 to effect movement of the plunger 45 through its intake stroke.

The pawl 87 is biased toward its first position and the cam follower 80 is biased into engagement with the periphery of the cam 76 by a tension spring 110. The tension spring 110 is located adjacent the leg 98 and has one end secured to the support frame 41 and its other end secured to an ear 112 integral with the pawl 87. As best shown in FIG. 3, the ear 112 of the pawl 87 is located slightly below the swivel connection of the pawl 87 to the drive pin 81 so that the spring 110 causes the pawl 87 to be biased about its swivel connection to pin 81 upwardly into engagement with the shoulder 102 on the plastic frame 91 and also be biased clockwise about its swivel connection with the drive pin 81 until leg 89 engages the side of portion 91b of plastic frame 91.

The pawl 87 is adapted to be moved from its first position, as shown in FIG. 3, toward its second position, as shown in FIG. 4, by the solenoid coil 92 when the latter is energized. Energization of the coil 92 causes the bridge member 88, which functions as an armature, to be moved toward the coil and hence, the pawl 87 to be moved towards its second position. Thus, the solenoid 92 forms a control means for effecting a driving connection between the drive means 75 and the pump plunger 45.

From the foregoing, it should be apparent that when the washer unit 16 is activated by energizing the solenoid 92 to move the pawl 87 from its first position towards its second position, as shown in FIG. 4, that a driving connection between the ear 105 of the pawl 87 and the pump rod 47 is effected.

As shown in FIG. 2, the pump plunger 45 is normally positioned at the end of its discharge stroke by the spring 72. When the cam follower member 80 is engaged with the rise portion 76a of one of the lobes of the cam 76, the drive pin 81 and the pawl 87 will be moved toward the right, as viewed in FIG. 2. Movement of the pawl 87 toward the right will cause the pump rod 47 and pump plunger 45 to move toward the right through its intake stroke in opposition to the biasing force of the spring 72. At the end of the intake stroke of the plunger 45, the cam follower 80 will be located at the high point of one of the lobes of the cam 76. Further rotation of the cam 76 in the direction of the arrow 78 causes the compression spring 72 to move the plunger through its discharge stroke to deliver a squirt of washing fluid against the windshield and the springs 72 and 110 causes the pawl 87 to be moved toward the left and the cam follower 80 to roll in engagement with the fall portion 76b of the lobe of the cam 76 it is engaged with until it reaches the low point thereof. Continued rotation of the cam 76 causes the rise portion 76a of the next adjacent lobe thereof to engage the cam follower 80 and move the same toward the right to initiate the next pumping cycle.

An important aspect of the present invention is the novel control or timer mechanism 44. The control and timer mechanism 44 is operable to maintain a driving connection between the plunger 45 of the pump 43 and the drive means 75 for a predetermined number of wiper strokes, during which the plunger 45 is fully reciprocated through its intake and discharge strokes for each of a predetermined number of wiper strokes, and then to automatically, abruptly interrupt the driving connection therebetween after the predetermined number of wiper strokes have been completed. This insures that the washing fluid delivered to the windshield by the pump 43 is at or substantially at the same pressure for each of the predetermined number of wiper strokes whereby pump efficiency is maximized and no wastage of washing fluid results.

The control mechanism 44, in general, comprises a plastic base 120 for supporting a shaft 122, a plastic ratchet wheel 124 rotatably supported on the shaft 122 and which is adapted to be indexed a predetermined angular extent during each rearward stroke of the pawl 87, when the latter is in its second position, and a plastic retainer means 126 for the pawl 87 and which is operable to hold the pawl 87 in the second position after the solenoid 92 is de-energized until the ratchet wheel has been indexed a complete revolution and then effect release of the pawl 87 to allow a spring 110 to move the pawl 87 towards its first position to interrupt the driving connection between the pawl 87 and the pump rod 47.

The base 120 is suitably secured to the frame 41 by integral fastener elements 130 and 132. The base includes an upwardly extending hub portion 134 into which is pressed fitted the lower end of the shaft 122 (SEE FIG. 7). The base 120 also includes integral, upwardly extending, spaced abutments 135, 136 and 137. Surrounding the hub portion 134 is a torsion spring 140 having one end biased against the abutment 135 and the other end disposed between the abutments 136 and 137.

The shaft 122 rotatably supports the indexable ratchet wheel 124. The ratchet wheel 124 has a central hub portion 144 which surrounds the shaft 122. The ratchet wheel includes a predetermined number of ratchet teeth 146 at equally spaced peripheral or circumferential locations. The teeth 146 have a first side 146a which extends radially of the ratchet wheel and a tapered side 146b. One of the teeth 146c is higher than the remaining or other teeth 146. The tooth 146c extends axially of the ratchet wheel so as to be coextensive with the hub portion 144. The reason for providing the higher tooth 146c will be explained hereafter.

The ratchet wheel 124 is located so as to be disposed within the path of movement of the pawl 87 when the latter is moved to its second position in which it is drivingly connected with the pump rod 47. The other leg 90 of the pawl 87 has a flexible portion or finger 90a defined by cut-outs 150 and 151. The finger 90a has a beveled ear 152 at its left end, as viewed in FIG. 4, which extends toward the ratchet wheel 124. The finger 90a is deflectable toward and from the plane of the leg 90 and is self-biased toward a position in which it lies in the plane of the leg 90. The ear 152 is adapted to hook behind the adjacently located tooth on the ratchet wheel 124 when the pawl 87 is moved rearwardly or toward the right as viewed in FIG. 4. The finger 90a will deflect away from the ratchet wheel 124 during the forward movement of the pawl 87 when the ear 152 engages the tapered side 146b of the next adjacently located tooth 146. It will hook over this tooth 146 when it reaches the end of its forward stroke due to the self-biasing force of the flexible finger 90a. Reverse rotation of the ratchet wheel 124 is prevented by a deflectable lever 147 having one end integral with the base 120 and its free end engageable with the teeth 146. The lever 147 is deflected by the tapered sides 146b of the teeth as the ratchet wheel 124 is rotated in a counterclockwise direction by the pawl 87, but engages the sides 146a to prevent reverse rotation.

The pawl 87 is held in its second position when drivingly connected with the pump rod 47 during one complete revolution of the ratchet wheel 124 by the retainer means 126. It should be noted at this point, that operation of the solenoid coil 92 is adapted to be effected by momentary depression of a manual push button switch (not shown). Since the spring 110 would cause the pawl to be moved toward its first or upper position in which it is disconnected from the pump rod 47 when the solenoid 92 is de-energized after being momentarily energized, it is necessary to provide a retainer means 126 for holding the pawl 87 in its second or lower position.

The retainer means 126 comprises a one-piece plastic member of generally triangular configuration. The retainer member 126 includes an inverted L-shaped upper portion which defines a shoulder 162 having a curved or arcuate outer periphery 162a, a depending leg portion 164 provided with a slot 166 and a cantilever supported finger 170 which is integral at one end with the retainer pawl 126 and which is hook shaped at its free end 170a. The slot 166 of the depending leg 164 is adapted to receive the end 140b of the torsion spring 140. The ends of the torsion spring 140 are compressed toward each other from its free state position such that it will be biased against the abutment 137 and serve to bias the retainer means or pawl 126 toward the position shown in FIG. 5. In this position, the shoulder 162 of the retainer means 126 overlies the leg 90 of the pawl 98 to hold the latter in its second position while the pawl 87 continues to index the ratchet wheel 124.

The pawl 126 is adapted to be moved from its position shown in FIG. 5 to a position as shown in FIG. 2 when the ratchet wheel has been indexed by the pawl 87 one complete revolution. On the next to last indexing movement of the ratchet wheel 124, the high tooth 146c thereon will engage the hooked end 170a of the finger 170 of the retaining means 126 and cause the same to be rotated in a counterclockwise direction in oppposition to the biasing force of the spring 140. When the shoulder 162 clears the leg 90 of the pawl 87, the spring 110 will cause the pawl 87 to be moved upwardly towards its first position in which it engages the shoulder 92 on the plastic frame 91. When the pawl 87 is in its second position, the curved portion of the shoulder 162 rides in engagement with the side of the leg 90 of the pawl 87 and with the pawl being slidable therepast as it is moved back and forth by the drive means 75.

Operation of the washer unit 16 can be initiated when the wiper unit 14 is energized by momentarily energizing the solenoid coil 92. It should be noted that when the wiper unit 14 is energized, the output shaft 27 is energized which causes the cam 76 to be rotated in the direction of the arrow 78 (SEE FIG. 2) which in turn causes the pawl 87 to be reciprocated back and forth while in its upper position and with the pawl 87 sliding on the shoulder 162 of the retaining means 126. When the solenoid coil 92 is momentarily energized, it causes the pawl 87 to be moved from its upper position towards its lower position, as shown in FIG. 4. Movement of the pawl 87 towards its lower position causes the leg 90 to disengage the peripheral surface 162a of the shoulder 162 of the retaining means 126. When this occurs, the torsion spring 140 will rotate the retaining means 126 in a clockwise direction to position the shoulder 162 over the leg 90 of the pawl 87. This holds the pawl 87 in its lower position in which it will be drivingly connected to the tab on the pump rod 47. When the pawl 87 is drivingly connected to the pump rod, it will cause the plunger 45 to be reciprocated through its intake and discharge strokes, and in a manner hereinbefore described.

When the pawl 87 is in its lower position, it will cause the ratchet wheel 124 to be indexed a predetermined angular extent during each rearward stroke, i. e., toward the right, as viewed in FIG. 5. This indexing movement of the ratchet wheel 124 continues until one complete revolution of the ratchet wheel is made. On the next to the last indexing movement, the high tooth 146c on the ratchet wheel 124 will engage the hooked end 170a of the finger 170 and cause the retaining means 126 to be rotated in a counterclockwise direction in opposition to the biasing force of the torsion spring 140. When the shoulder 162 is rotated to clear the leg 90 of the pawl 87, the pawl is caused to be moved toward its upper position by the spring 110. This interrupts the driving connection between the pump rod 47 and the pawl 87 and prevents the retaining means 126 from being rotated toward its position in which it holds down the pawl. On the last indexing movement, which is an idle stroke of the pawl after the pumping cycle, the ear 152 engages surface 146d of the high tooth 146c to cause the ratchet wheel 124 to be indexed and the finger 170 to be flexed to break the engagement between the finger 170 and the tooth 146c. When the engagement between the finger 170 and tooth 146c is borken, the retaining means 126 releases the pawl, it will thereafter be biased into engagement with the side of the pawl 87 and with the pawl being slidable on the curved surface 162a of the shoulder 162 as it continues to be reciprocated by the drive means 75. The number of squirts of washer fluid delivered will be equal to the number of ratchet teeth minus one. The entire washer pump assembly 40 is covered by a plastic snap-on cover 199.

FIGS. 8–11 show a second embodiment of a washer pump assembly 200 of the present invention. The washer pump assembly 200 is identical to the washer pump assembly 40 except that a different control or timer means 210 is employed and a slightly different pawl 212 is employed. In all other respects, the washer pump assembly 200 is identical to the washer pump assembly 40 and corresponding parts thereof will be given the same reference numerals, but with a prime affixed thereto.

The pawl 212 is of an identical construction to the pawl 87 except that it contains an additional slot or cutout 214 adjacent the upper side of the other leg 90'. As best shown in FIG. 9, the slot 214 is slanted in a downward direction and for reasons that will be hereinafter more fully described.

The control and timer means 210 is of a one-piece plastic construction and comprises a hollow, generally cylindrical or drum-like member 216 which is rotatably supported on a stub shaft 218 secured to the frame 41'. The member 216 adjacent its lower end has a plurality of circumferentially or peripherally spaced ratchet teeth 220. The ratchet teeth 220 have one face 220a which extends generally radially of the member 216 and another face 220b which is rounded or tapered. The ratchet teeth 220 are supported on cantilever arms 224 integral with the member 216 adjacent its upper end. The cantilever arms 224 and teeth 220 are integral with each other and the cantiliver arm 224 is defined by spaced axially extending slits 230. The ratchet teeth 220 are deflectable radially of the member 216 and the cantilever arms 224 are self-biased toward the position shown in FIGS. 8 and 11 in which the ratchet teeth will be disposed within the path of movement of the other leg 90' of the pawl 212. One of the ratchet teeth 220c is higher than the others, i.e., extends axially of the member 216 a greater extent than the others.

The member 216 also has a retaining means 235 adjacent its upper end for holding the pawl 212 in its down position when moved thereto by the solenoid 92'. The retaining means 235 are in the form of a plurality of radially outwardly extending projections 250 at equally spaced circumferential or peripheral locations. The projections 240 are located in radial planes extending intermediate and equi-distant from the adjacent ratchet teeth 220. It should be noted, as best shown in FIG. 11, that there is no projection 240 at the location 241 between the high ratchet tooth 220c and the tooth 220 immediately to the right thereof, and for reasons to be noted hereinafter. Also, the projection 240a located immediately to the left of the high tooth, as viewed in FIG. 11, is radially deflectable. To this end, the projection 240a is carried by a cantilever arm 250 integral with the annular member 216 adjacent its lower end and with the arm being defined by a cut-out 251. The arm 250 is self-biased to position the protrusion 240a so that its radial outermost end lies on a circumscribed circle encompassing the radial outermost ends of the rigid projections 240.

The annular member is made from a suitable or conventional plastic material which is substantially rigid but yet resilient or flexible enough to enable the ratchet teeth and the protrusion 240a to be deflected radially.

When the washer unit is de-energized, the relative positions of the timer means 210 relative to the pawl 212 are such that the flexible projection 240a is received within the cut-out 214 of the other leg 90' on the pawl 212 and the pawl 212 being biased against the shoulder 102' and side of portion 91b' of the frame 91' by the spring 110'.

When washer unit operation is desired, when the wiper unit is energized, the operator will momentarily depress a manual switch (not shown) to energize the solenoid coil 92'. Energization of the solenoid coil 92'' causes the pawl 212 to be moved from its upper position toward its lower position, as shown in FIGS. 8 and 9, in which the ear 152' will hook behind the adjacently located ratchet tooth 220. As the pawl 212 is moved towards its lower position, the upper part of the leg 90' defining the slot 214 will cause the projection 240a to be deflected radially inwardly of the member 216 until the pawl reaches its lower positions at which time the projection 240a will spring back towards its normal position and overlie the leg 90' of the pawl 212. This holds the pawl 212 in its lower position when the solenoid 92' is de-energized subsequent to being momentarily energized.

Also, when the pawl 212 is moved to its lower position, the ear 105' thereof will engage the tab 106' on the pump rod 47' to begin pumping operation, and in the same manner as hereinbefore described in connection with the washer pump assembly 40. The annular member 216 will be indexed an annular distance equal to the distance between two ratchet teeth each time the pawl 212 is moved through its rearward stroke or towards the right as viewed in FIG. 8. As the member 216 is intermittently indexed by the pawl 212, the rigid projections 240 will be rotated to a position to maintain the pawl 212 in its lower position. This indexing movement continues until the portion or location 241 of the annular member 216 which does not contain a projection 240, is located immediately adjacent the other leg 90' of the pawl 212. This occurs on the next to the last indexing movement. When this occurs, the spring 110' will cause the pawl 212 to be moved from its lower position towards its upper position and interrupt the driving connection between the pump rod 47 and the pawl 212.

The annular member 216, however, is indexed one additional indexing movement to complete one revolution; and to position the deflectable protrusion 240a within the cut-out 214 of the pawl 212. This additional indexing movement occurs as a result of the high tooth 220c since the ear 152' on the leg 90' on the pawl 212 will engage the high tooth to effect the last indexing movement and to position the deflectable protrusion 240a within the cut-out 214. When this occurs, the timer will no longer be indexed, since the pawl 212 is in its upward position and will not engage the lower teeth 220.

Reverse rotation of the annular member 216 is prevented by tangs 221 which are bent upwardly from the frame 41'. The tangs 221 are located such that they will cause the teeth 220 to be deflected radially inwardly when the member 216 is indexed, but engage the other side 220a of the tooth to prevent reverse rotation.

From the foregoing, it should be apparent that a novel washer pump assembly for intermittently delivering squirts of washing fluid onto a windshield of an automotive vehicle have been provided. It should also be apparent that the control and timer means of the washer pump assemblies are of a relatively simple and inexpensive construction.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention. It is claimed:

1. A washer pump assembly for intermittently delivering squirts of washer fluid from a predetermined interval to a windshield of an automotive vehicle comprising:

a support means;

a washer pump supported by said suppprt means and having a plunger means which is reciprocable through intake and discharge strokes;

first spring means for effecting movement of said plunger means through one of its strokes;

a drive means having an interruptible driving connection with said plunger means and when drivingly connected therewith alternately effecting movement of the plunger means through its other stroke in opposition to the biasing force of said first spring means and permitting said spring means to move said plunger means through said one stroke, said drive means including a drive pawl which is constantly reciprocated through first and second strokes when said drive means is energized and which is movable between a first position in which it is not drivingly connected with said plunger means and a second position in which it is drivingly connected with said plunger means, and a control mechanism operable to establish a driving connection between said plunger means and said pawl to effect movement of said plunger means through its strokes for a predetermined number of strokes and then to interrupt the driving connection therebetween, said control mechanism comprising a second spring means for biasing the pawl towards its first position, a selectively energizable control means for effecting movement of the pawl from its first position towards its second position and in opposition to the biasing force of said second spring means, and a timer means for controlling the length of time the pawl is drivingly connected to the pumping means after the pawl has been moved towards its second position upon momentary energization of said control means, said timer means being rotatably supported by said support means adjacent said pawl and including an indexable ratchet wheel which is adapted to be indexed a predetermined angular extent during each second stroke of the pawl when the latter is in its second position, and a retainer means operable to hold said pawl in its second position after said control menas is de-energized unitl the ratchet wheel has been indexed a predetermined angular extent and then effect release of the pawl to allow said second spring means to move said pawl towards its first position in which it is disconnected from said plunger means and does not index the ratchet wheel as it is reciprocated by said drive means.

2. A washer pump assembly for intermittently delivering squirts of washer fluid for a predetermined time interval to a windshield of an automotive vehicle comprising:

a support means;

a washer pump supported by said support means and having a plunger means which is reciprocable through intake and discharge strokes;

first spring means for effecting movement of plunger means through its discharge stroke;

a drive means having an interruptible driving connection with said plunger means and when drivingly connected with said plunger means alternately effecting movement of the latter through its intake stroke in opposition to the biasing force of said first spring means and permitting said spring means to move said plunger means through its discharge stroke, said drive means including a drive pawl having a pair of spaced legs which constantly reciprocated through first and second strokes when said drive menas is energized and which is movable between an upper position in which its first leg is not drivingly connected with said plunger means and a second position in which it is substantially parallel to the support means and in which its first leg is drivingly connected with said plunger means, and a control mechanism operable to establish a driving connection between said plunger means and said first leg of said pawl to effect movement of said plunger means through its strokes for a predetermined number of strokes and then to automatically and abruptly interrupt the driving connections therebetween, said control mechanism comprising a second spring means for biasing the pawl towards its first position and against a stop surface, a selectively energizable solenoid for effecting movement of the pawl from its first position in opposition to the biasing force of said second spring means towards its second position, and a timer means for controlling the length of time the pawl is drivingly connected to the plunger means after the pawl has been moved towards its second position upon momentary energization of said solenoid, said timer means including an indexable ratchet wheel rotatably supported on a stationary shaft carried by said support means adjacent said second leg of said pawl and which is adapted to be indexed a predetermined angular extent during the second stroke of the pawl when the latter is moved to its second position, a retainer means rotatably supported by said shaft for movement between first and second positions, said retainer means when in its first position having a part thereof in engagement with the second leg of the pawl along its side and with the pawl being slidable therepast when in its first position, said retainer means when in its second position having said part thereof overlying said sides of said pawl to hold the first leg in its second position after the solenoid is de-energized subsequent to being momentarily energized, third spring means for biasing said retainer means towards its second position, said ratchet wheel having means thereon which engage a second part on said retainer means to effect movement of the retainer means from its second position towards its first position in opposition to the biasing force of said third spring means to release said pawl for movement to its first position by said second spring means to interrupt the driving connection between the first leg of the pawl and the plunger means and prevent further indexing movement of the ratchet wheel when the ratchet wheel has been indexed a complete revolution.

3. A washer pump assembly for intermittently delivering squirts of washer fluid for a predetermined time interval to a windshield of an automotive vehicle comprising:

a support means;
a washer pump supported by said support means and having a plunger means which is reciprocable through intake and discharge strokes;
first spring means for effecting movement of plunger means through its discharge stroke;
a drive means having an interruptible driving connection with said plunger means and when drivingly connected with said plunger means alternately effecting movement of the latter through its intake stroke in opposition to the biasing force of said first spring means and permitting said spring means to move said plunger means through discharge stroke, said drive means including a drive pawl having a pair of spaced legs which is constantly reciprocated through first and second strokes when said drive means is energized and which is movable between an upper position in which its first leg is not drivingly connected with said plunger means and a second position in which it is substantially parallel to the support means and in which its first leg is drivingly connected with said plunger means, and
a control mechanism operable to establish a driving connection between said plunger means and said first leg of said pawl to effect movement of said plunger means through its strokes for a predetermined number of strokes and then to automatically and abruptly interrupt the driving connections therebetween,
said control mechanism comprising a second spring means for biasing the pawl towards its first position and against a stop surface, a selectively energizable solenoid for effecting movement of the pawl from its first position in opposition to the biasing force of said second spring means towards its second position, and a timer means for controlling the length of time the pawl is drivingly connected to the plunger means after the pawl has been moved towards its second position upon momentary energization of said solenoid;
said timer means including an indexable ratchet wheel rotatably supported on a shaft carried by said support means and which is adapted to be indexed a predetermined angular extent during the second stroke of the pawl when the latter is moved to its second position, said ratchet wheel having a plurality of circumferentially spaced teeth and with one of the teeth extending axially of the shaft a greater height than the remaining teeth, a retainer means rotatably supported by said shaft above said ratchet wheel for movement between first and second positions, said retainer means having a flange provided with a curved peripheral surface, said retainer member when in its first position having the peripheral surface of its flange in engagement with the other leg of the pawl along its side and with the pawl being slidable therepast when in its first position, said retainer means when in its second position having said flange thereof overlying said one leg of said pawl to hold the pawl in its second position after said solenoid is deenergized subsequent to being momentarily energized, third spring means for biasing said retainer member toward its second position, said higher tooth on said ratchet wheel being engageable with a cantilever supported finger on said retainer means to effect rotational movement of the retainer means from its second position towards its first position and thereby release said pawl for movement towards its first position by said second spring means to interrupt the driving connection between the one leg of the pawl and the plunger means and to prevent further indexing of the ratchet wheel when the ratchet wheel has been indexed one complete revolution.

4. A washer pump assembly for intermittently delivering squirts of washer fluid for a predetermined interval to a windshield of an automotive vehicle comprising:

a support means;
a washer pump supported by said support means and having a plunger means which is reciprocable through intake and discharge strokes;
first spring means for effecting movement of said plunger means through one of its strokes;
a drive means having an interruptible driving connection with said plunger means and when drivingly connected therewith alternately effecting momvement of the plunger means through its other stroke in opposition to the biasing force of said first spring means and permitting said spring means to move said plunger means through said one stroke,
said drive means including a drive pawl which is constantly reciprocated through first and second strokes when said drive means is energized and which is movable between a first position in which it is not drivingly connected with said plunger means and a second position in which it is drivingly connected with said plunger means, and
a control mechanism operable to establish a driving connection between said plunger means and said pawl to effect movement of said plunger means through its strokes for a predetermined number of strokes and then to interrupt the driving connection therebetween,
said control mechanism comprising a second spring means for biasing the pawl towards its first position, a selectively energizable control means for effecting movement of the pawl from its first position towards its second position and in opposition to the biasing force of said second spring means, and a timer means for controlling the length of time the pawl is drivingly connected to the pumping means after the pawl has been moved towards its second position upon momentary energization of said control means,
said timer means comprising a hollow annular plastic member rotatably supported on a stationary shaft carried by said support means adjacent said other leg of said pawl, said annular member having a plurality of peripherally spaced ratchet teeth adjacent its lower end with one of the teeth extending axially of the annular member a greater extent than the other ratchet teeth, each of said teeth being on a flexible cantilever arm integral with the annular member adjacent its upper end to allow said teeth to be deflected radially of the annular member, said arms being self-biased to position the teeth in a position in which they will be in a path of movement of said pawl, said annular member also having a retainer means comprising a plurality of radially outwardly extending protrusions at peripherally spaced locations adjacent its upper end, said member having no protrusions at a location immediately adjacent one side of a radial plane passing through said one tooth of said ratchet wheel and having a protrusion carried on a flexible cantilever arm integral with the annular member adjacent its lower end to allow said protrusion to be deflected radially of the annular member, said flexible protrusion being self-biased to a position which is located in the path of movement of said pawl, said pawl when in its first position having a slot therein positioned to receive the flexible protrusion on said annular member, when said control means is momentarily energized said pawl is moved toward its second position to drivingly interconnect said plunger means and said pawl, the pawl as it is moved toward its second position causing the flexible protrusion to be deflected radially inwardly of the annular member and the pawl to engage the ratchet tooth to begin indexing movement the ratchet wheel, when moved through its second stroke, said flexible protrusion overlying said pawl to hold the latter in its second position when said control means is de-energized subsequent to being momentarily energized, said rigid protrusions on the ratchet wheel overlying the pawl to hold the pawl in its second position during subsequent indexing movements of the ratchet wheel, said pawl being movable from its second position towards its first position when the annular member has been indexed to a position at which said location is immediately adjacent said pawl during its next to the last indexing movement, said high tooth of said ratchet wheel being engageable by said pawl during the last indexing movement to position the flexible protrusion within the slot in the pawl.

* * * * *

PO-1050
(5/69)

UNITED STATES PATENT OFFICE
CERTIFICATE OF CORRECTION

Patent No. 3,799,704            Dated March 26, 1974

Inventor(s)            Lloyd L. Kuck

It is certified that error appears in the above-identified patent and that said Letters Patent are hereby corrected as shown below:

Column 3, line 6, "automtmotive" should read -- automotive --. Column 5, line 14, "extending 105 extnding" should read -- ear 105 extending --; line 19, "57" should read -- 47 --; line 29, after "leg" change "98" to -- 89 --. Column 7, line 54, "98" should read -- 87 --. Column 8, line 55, "borken" should read -- broken --. Column 9, line 38, after "projections" change "250" to -- 240 --. Column 11, line 5, "from" should read -- for --; line 42, "pumping" should read -- plunger --; line 53, "menas" should read -- means --; same line, "unitl" should read -- until --. Column 12, line 12, after "which" insert -- is --; line 14, "menas" should read -- means --. Column 14, line 25, "momve-" should read -- move- --; line 50, "pumping" should read -- plunger --; line 59, after "end" insert -- and --.

Signed and sealed this 1st day of April 1975.

(SEAL)
Attest:

RUTH C. MASON
Attesting Officer

C. MARSHALL DANN
Commissioner of Patents
and Trademarks